No. 637,097. Patented Nov. 14, 1899.
L. T. EANES.
COFFEE ROASTER.
(Application filed May 25, 1897.)
(No Model.)
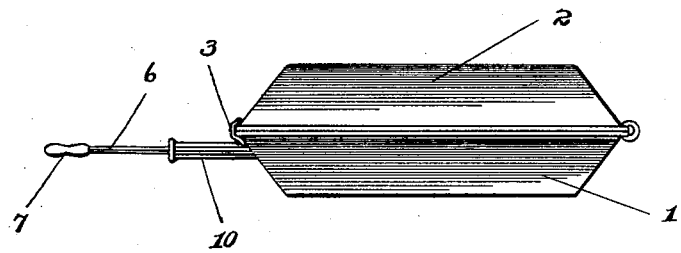
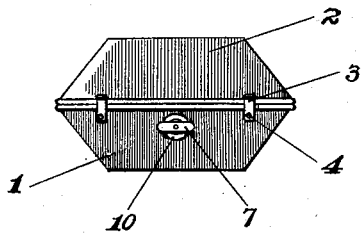
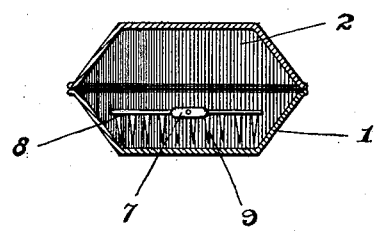
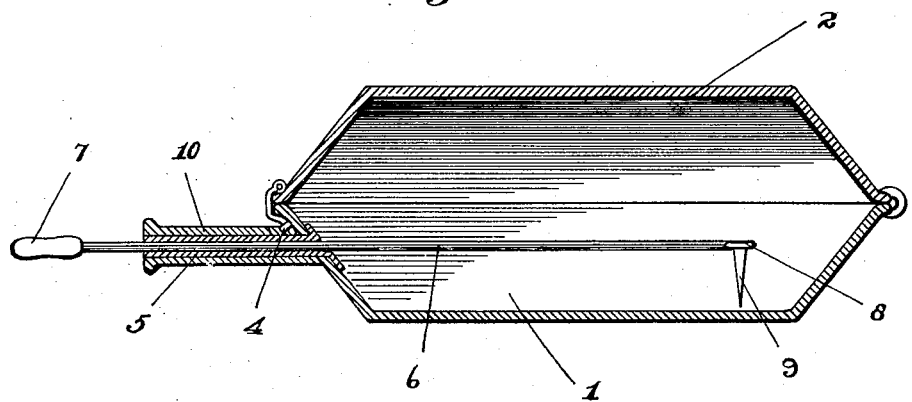
Witnesses
A. B. Berry,
James F. Duhamel
Inventor
Louis T. Eanes,
by John Wedderburn
Attorney
THE NORRIS PETERS CO., PHOTO-LITHO., WASHINGTON, D. C.

UNITED STATES PATENT OFFICE.

LOUIS T. EANES, OF WHATLEY, ALABAMA.

COFFEE-ROASTER.

SPECIFICATION forming part of Letters Patent No. 637,097, dated November 14, 1899.

Application filed May 25, 1897. Serial No. 638,047. (No model.)

*To all whom it may concern:*

Be it known that I, LOUIS T. EANES, of Whatley, in the county of Clarke and State of Alabama, have invented certain new and useful Improvements in Coffee-Roasters; and I do hereby declare the following to be a full, clear, and exact description of the invention, such as will enable others skilled in the art to which it appertains to make and use the same.

This invention relates to coffee-roasters; and the object of the invention is to provide a new and improved means for stirring or agitating the coffee while roasting.

In the drawings herewith forming part of this specification, Figure 1 is a side view of my improved coffee-roaster. Fig. 2 is an end view thereof. Fig. 3 is a vertical cross-sectional view showing the rake adapted to stir the coffee within the receptacle. Fig. 4 is a longitudinal sectional view of the entire device, showing the receptacle, the cover, rake-handle, and the roaster-handle, and the manner in which the same is operated.

In the construction of my improved roaster I provide, first, a pan 1 of any desired shape or size, but preferably, as shown, of inverted conical form, having a conical top 2 therefor, with suitable latches 3 and latch-pins 4 for securing the two sections together. From one end and from the upper edge of the pan portion 1 I project a tubular handle 5, opening into the pan and opening outwardly. I next provide a cylindrical rod 6, adapted to move freely back and forth through said tubular handle 5, and upon the outer end of said rod 6 I provide a handle 7, of semicircular or other form, by means of which the rod 6 may be reciprocated. Upon the inner end of the rod 6 I provide a transverse bar 8, rigidly secured to said rod and having depending therefrom a series of teeth 9, so as to form a transverse rake within the interior of said roaster. The said rake or stirrer may be of any form or pattern desired, which may be manipulated by a forward-and-backward movement, so as to effect the purpose of changing the position of the coffee-grains.

From the nature of my device all the parts excepting the handle 7 must necessarily be constructed of metal, preferably of iron, the pan and cover being preferably of japanned sheet-iron. The handle 7 upon the rod 6 may be, however, constructed of wood, if desired, and there may be also a wooden sleeve 10, provided upon the tubular handle 5, projected from the end of the roasting-pan 1.

Having thus described my invention, what I claim as new, and desire to secure by means of Letters Patent, is—

In a coffee-roaster, the combination, with a roasting-pan, of the rod slidable parallel to the bottom of the pan, and the teeth depending at right angles from the rod, said teeth being reciprocated upon the bottom of the pan by sliding the rod, substantially as set forth.

In testimony whereof I have signed this specification in the presence of two subscribing witnesses.

LOUIS T. EANES.

Witnesses:
    L. L. MCLEOD,
    C. E. PUGH.